Nov. 19, 1935.  F. L. SHELOR  2,021,266

BRAKING MECHANISM FOR MOTOR VEHICLES

Filed Sept. 15, 1933  2 Sheets-Sheet 1

Inventor
Frederick L. Shelor
By Sturtevant, Mason & Porter
Attorneys

Nov. 19, 1935.  F. L. SHELOR  2,021,266

BRAKING MECHANISM FOR MOTOR VEHICLES

Filed Sept. 15, 1933  2 Sheets—Sheet 2

Inventor
Frederick L. Shelor
Sturtevant, Mason
and Porter
Attorneys

Patented Nov. 19, 1935

2,021,266

UNITED STATES PATENT OFFICE 2,021,266

BRAKING MECHANISM FOR MOTOR VEHICLES

Frederick L. Shelor, Richmond, Va., assignor to Innovation Brakes, Inc., Richmond, Va., a corporation of Virginia Application September 15, 1933, Serial No. 689,631

8 Claims. (Cl. 188—72)

The invention relates to new and useful improvements in a braking mechanism for motor vehicles, and more particularly to a braking mechanism which may be associated with each wheel of the vehicle.

An object of the invention is to provide a braking mechanism wherein brake shoes located at the wheel are adapted through a lateral movement of one toward and from the other to contact with or release a braking member movable with the wheel, and wherein the brake shoes are moved into gripping contact with opposite sides of the braking member by cooperating mechanical devices.

A further object of the invention is to provide a braking mechanism of the above type wherein fluid means may be used for moving the brake shoe independently of the operation of the cooperating mechanical devices.

These and other objects will in part be obvious and will in part be hereinafter more fully disclosed.

In the drawings which show by way of illustration one embodiment of the invention—

Fig. 3 is an enlarged sectional view similar to that at the lower part of Fig. 1, but showing the brake shoes moved into gripping engagement with the braking member;

Fig. 4 is a detail showing a portion of the supporting ring, an operating wedge, and the immediate parts which cooperate therewith in the movement of the brake shoe.

In my co-pending application Serial No. 652,389, filed January 18, 1933, there is shown a braking mechanism which is especially adapted for a motor vehicle wheel, and wherein there are brake shoes fixed against rotation, but one of which has a lateral movement relative to the other. There is also a braking member which rotates with the wheel and has a lateral movement relative to the wheel. Associated with the brake shoes are disks which form a chamber which may be placed under vacuum for the purpose of shifting the movable brake shoe for applying the brakes, and springs separate the disks for releasing the brakes.

The present invention has to do with improvements in the braking mechanism shown in this prior application, and includes cooperating mechanical devices which may be used for shifting the movable brake shoe for applying the brakes without the use of any fluid pressure, due to the placing of the chamber under vacuum. An operating ring is mounted on the fixed brake shoe so that it may be shifted through a slight angle thereon. This is accomplished by rock levers pivoted to the fixed disk and having a forked connection with a pin on the ring. The rock levers are connected together, and in turn are connected to any suitable means whereby the operator may exert a pull on the levers for shifting the ring. Associated with the ring are wedge members which extend beneath rollers carried by a bolt extending through the fixed brake shoe and attached to the movable brake shoe so that when the wedge members are shifted in one direction, the movable brake shoe will be shifted into engagement with the braking member, and shift said braking member laterally into engagement with the stationary brake shoe. These cooperating mechanical devices which shift the brake shoes for applying the brakes are operated entirely independently of the condition of the chamber shifting the brake shoes, while on the other hand, the mechanical devices do not, in any way, interfere with the shifting of the brake shoes through the placing of a chamber under vacuum and thus, through atmospheric pressure, shifting the movable brake shoe into contact with the braking member and the braking member into contact with the fixed brake shoe.

Figure 5:
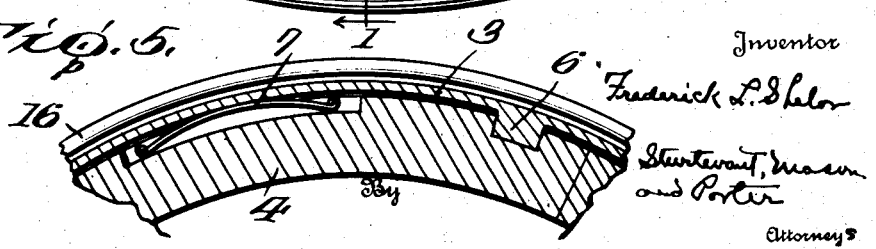
Fig. 5 is a detail in section showing the connection of the braking member to the drum.

It is thought that the invention will be better understood by a detail description of the illustrated embodiment thereof. As shown in the drawings, the invention is applied to a motor vehicle wheel which is shown in part only. The hub of the wheel is indicated at 1, and the axle housing on which the wheel is mounted is indicated at 2. Attached to and turning with the wheel is a brake drum 3 carrying a braking member 4. This braking member 4 is attached to the drum so that it rotates with the drum. The braking member is preferably made in segments. The segments have their ends abutted as shown in Fig. 5 of the drawings. There are lugs 6 on the brake drum which engage recesses in the braking member, and these recesses extend all the way across the outer face of the braking member, so that it is free to move laterally on the brake drum, although it is restrained from movement, except that it turns with the drum. Springs 7 are provided which press the segments inwardly radially of the wheel and thus hold the ends of the segments in contact and thus prevent any rattling when the brake shoes are released from engagement with the braking member.

Attached to the axle housing is a disk 8 which forms one wall of a vacuum chamber, as illustrated in the present embodiment of the invention. This disk is fixed and does not turn or have any lateral movement. It is provided with a hub 9. Associated with the disk 8 is a movable disk 10 which is spaced therefrom. This movable disk 10 is preferably keyed to the hub so that while it cannot rotate, it is free to move laterally relative to the disk 8. Springs 11 seated in sockets carried by the disk 8 contact with the disk 10 and tend to separate the disks. A flexible diaphragm 12 is attached to the hub 9 and to the movable disk 10 which closes the chamber 13 between the disks in the region of the hub. A flexible band 14 is attached to the disks 8 and 10 at the periphery thereof and closes the chamber 13 at the periphery of the disk. A pipe 15 is attached to the disk 8 and leads to the chamber 13 and this pipe is connected through a suitable valve mechanism with a vacuum creating means whereby the chamber 13, at the will of the operator, may be placed under vacuum.

Figure 1:
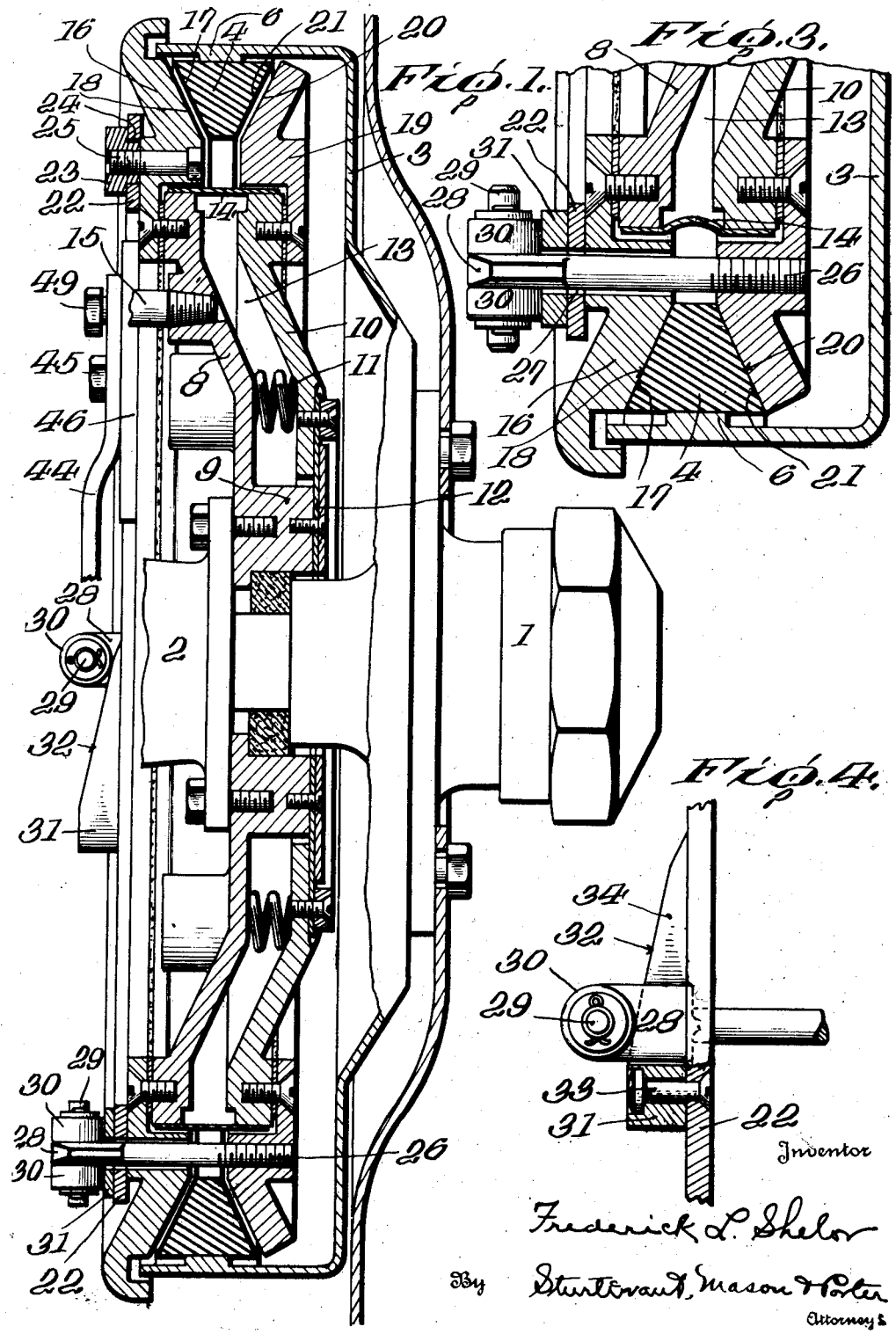
Figure 1 is a sectional view through a motor vehicle wheel showing the improved braking mechanism applied thereto.

Attached to the fixed disk 8 is a brake shoe 16. The braking member 4 may be made of any suitable construction used for braking purposes, and it has a tapered face 17 which is adapted to contact with the tapered face 18 on the brake shoe 16 when the braking member 4 is moved laterally to the left as viewed in Fig. 1. Attached to the shiftable disk 10 is a brake shoe 19 which is likewise provided with a tapered surface 20 adapted to contact with a similarly shaped tapered surface 21 on the braking member 4. The springs shift the disk 10 and the brake shoe 19 so as to separate the brake shoes and hold them from contact with the braking member. When the chamber 13 is placed under vacuum, the atmospheric pressure against the disk 10 will force the same to the left, causing the brake shoe 19 to engage the braking member 4 and shift the braking member 4 into contact with the brake shoe 16, and thus it is that the braking member is gripped between the brake shoes. The extent of the degree of gripping pressure of the brake shoes on the braking member will be determined by the degree of vacuum placed on the chamber 13. The means for actuating the brake shoes just described per se, forms no part of the present invention, but is shown and described in my co-pending application above referred to, and in my co-pending application Serial No. 572,705, filed November 2, 1931.

The present invention has to do with mechanical cooperating devices for shifting the movable brake shoe 19 for bringing the brake shoes into gripping engagement with the braking member, which mechanical cooperating devices may be used alone and entirely independently of the vacuum control therefor, and which does not, in any way, interfere with the use of the vacuum controlled operating means. Attached to the brake shoe 16 is a ring 22. Said ring is attached to the brake shoe by bolts 25, 25, 25. The ring is provided with slots 24, and there is a bolt at each slot. Threaded on to each bolt is a nut 23, and the nut 23 is provided with a hub which projects into the slot 24. Thus it is that the ring is free to turn in an angular direction about the center of the wheel on these supporting bolts. Extending through the brake shoe 16 and threaded into the brake shoe 19 are bolts 26, 26, 26. There are preferably three of these bolts which are equally spaced from each other about the brake shoe. The opening in the brake shoes 16 is sufficient so as to provide a clearance, and this permits the bolt to freely move in an endwise direction through the brake shoe 16. The ring 22 is provided with an opening 27, and the bolt extends freely through this opening. The bolt is provided with a head 28 which carries a pin 29 extending laterally to both sides of the head, and mounted at each side of the head on said pin is a roller 30. These rollers 30 may be held on the pin in any suitable way, and are free to rotate thereon. Disposed between the rollers and the ring 22 is a wedge member 31. There is a wedge member associated with each pair of rollers. The rollers engage the inclined face 32 of the wedge member. The wedge member is secured to the ring and moves therewith through a clamping bolt 33. This wedge member is slotted as indicated at 34, so that it straddles the head 28.

Figure 2:
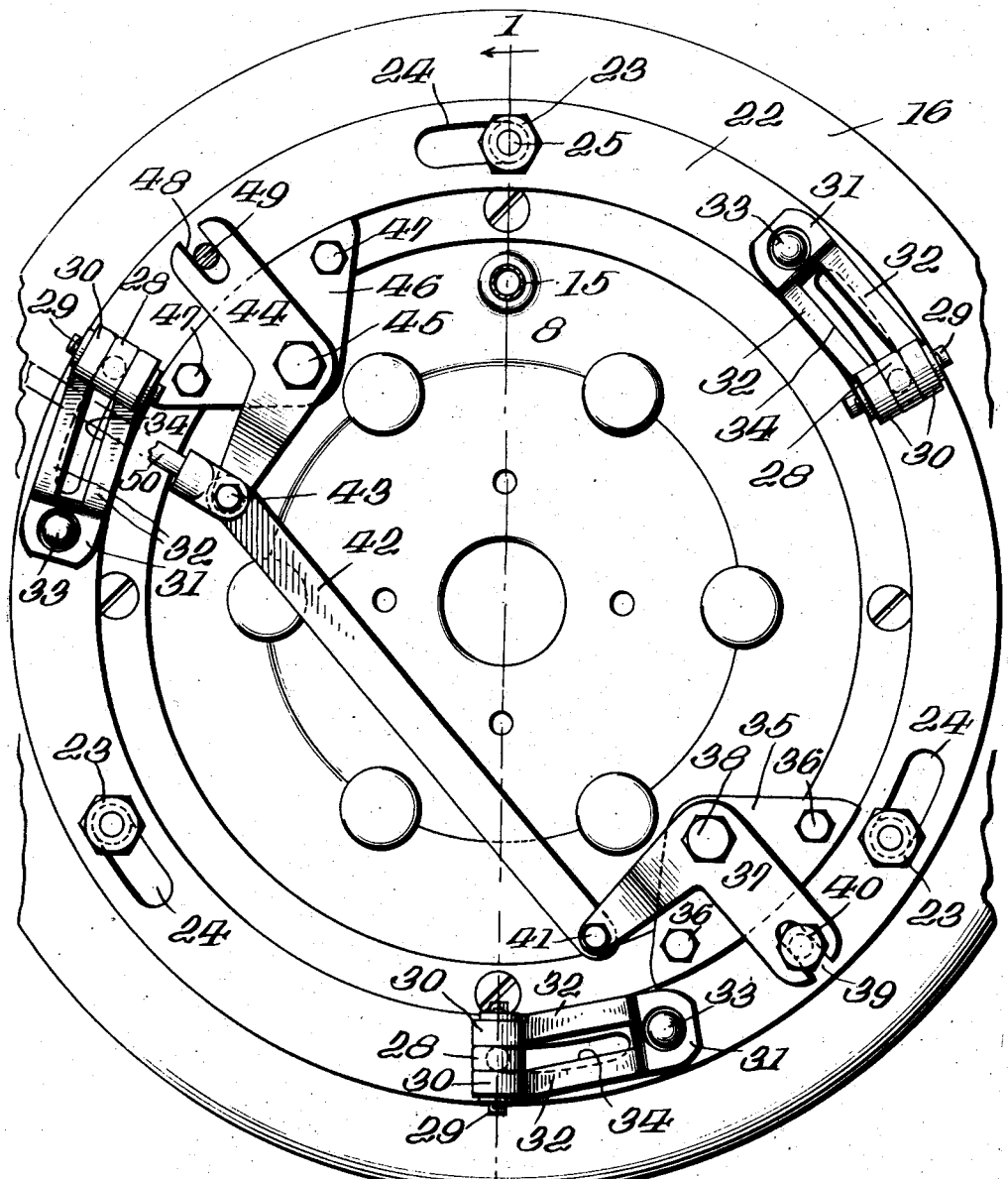
Fig. 2 is an inner side view of the wheel detached from the motor vehicle.

Fixed to the brake shoe 16 is a bracket 35. Said bracket is secured to the brake shoe by bolts 36, 36. Pivoted to the bracket 35 is a rock lever 37. Said rock lever is pivoted at 38 to said bracket. One arm of this rock lever extends substantially radially of the wheel, and is forked at the outer end as indicated at 39. The forked end of the rock lever straddles a bolt 40 which is fixed to the ring 22. The other arm of the rock lever extends substantially at right angles to the first-named arm, and is pivoted at 41 to a link 42 which in turn is pivoted at 43 to a rock lever 44. The rock lever 44 is pivoted at 45 to a bracket 46 secured to the brake shoe by bolts 47, 47. This rock lever 44 is shaped similarly to the rock lever 37, and the radial arm thereof is slotted as indicated at 48 and engages a bolt 49 attached to the ring 22. A rod 50 is pivoted to the rock lever 44 and serves as a means, when pulled on, for turning the ring 22 in a clockwise direction, as viewed in Fig. 2, and when pushed on, for turning said ring in a counter-clockwise direction.

When the rod 50 is pulled on, it will shift the ring 22 in a clockwise direction, and this will force the wedges beneath the rollers and cause the movable brake shoe 19 to shift into contact with the braking member 4, and force the braking member 4 into contact with the brake shoe 16. In Fig. 3 of the drawings, this condition of the brake shoes gripping the braking member is shown as accomplished by a shifting of the wedge members. When the rod 50 is released, and pushed on, then the wedge members will be withdrawn, and the springs 11 will separate the brake shoes, thus releasing the braking member.

It will be apparent from the above that either the cooperating mechanical devices may be actuated for applying the brakes, or the vacuum controlled means may be operated for applying the brakes. These may be operated entirely independently, as the cooperating mechanical devices when releasing the brakes, do not interfere with the shifting of the movable braking member. It will also be apparent that the mechanically operated braking means is complete and operative entirely irrespective of the vacuum operated means, and may be used as a braking means independently thereof. In other words, the disks 8 and 10 which form the walls of the vacuum chamber, may serve solely as the means for supporting the brake shoes, in which case, there would be no diaphragms connecting the disks and no pipe attached to a vacuum creating means. It is obvious, therefore, that the invention, as defined in the appended claims, is not necessarily limited to a braking mechanism with which is associated a vacuum operated control means therefor. It does, however, have particular advantages, when combined therewith, and is so covered by certain of the claims.

Having thus described the invention, what I claim as new and desire to secure by Letters Patent, is:—

1. A braking mechanism for motor vehicles including in combination, a braking member attached to and movable with the wheel and capable of lateral movement thereon, a fixed disk, a brake shoe attached to said disk and having a tapered face adapted to cooperate with a similarly tapered face on the braking member, a shiftable disk associated with said fixed disk and fixedly held from rotation, a brake shoe mounted on said shiftable disk and having a tapered face adapted to engage a similarly tapered face on the opposite side of the braking member from that engaged by the first-named brake shoe, springs for separating said disks, manual means for shifting said shiftable disk toward the fixed disk for causing the brake shoe carried by the shiftable disk to contact with the braking member and move said braking member into engagement with the brake shoe carried by the fixed disk, means connecting said fixed disk and said shiftable disk and forming therebetween a chamber, and a pipe connected to said chamber whereby a vacuum may be placed on said chamber and the shiftable disk shifted by atmospheric pressure thereon for causing the shiftable brake shoe to engage the braking member.

2. A braking mechanism for motor vehicles including in combination, a braking member attached to and movable with the wheel and capable of lateral movement thereon, a fixed disk, a brake shoe attached to said disk and having a tapered face adapted to cooperate with a similarly tapered face on the braking member, a shiftable disk associated with said fixed disk and fixedly held from rotation, a brake shoe mounted on said shiftable disk and having a tapered face adapted to engage a similarly tapered face on the opposite side of the braking member from that engaged by the first-named brake shoe, springs for separating said disks, manual means for shifting said shiftable disk toward the fixed disk for causing the brake shoe carried by the shiftable disk to contact with the braking member and move said braking member into engagement with the brake shoe carried by the fixed disk, said manual means including a ring mounted on the fixed disk, wedge members attached thereto, and bolts carried by the shiftable brake shoe and associated with said wedge members whereby the shifting of the ring through the wedge members will cause the shiftable brake shoe to engage the braking member.

3. A braking mechanism for motor vehicles including in combination, a braking member attached to and movable with the wheel and capable of lateral movement thereon, a fixed disk, a brake shoe attached to said disk and having a tapered face adapted to cooperate with a similarly tapered face on the braking member, a shiftable disk associated with said fixed disk and fixedly held from rotation, a brake shoe mounted on said shiftable disk and having a tapered face adapted to engage a similarly tapered face on the opposite side of the braking member from that engaged by the first-named brake shoe, springs for separating said disks, manual means for shifting said shiftable disk toward the fixed disk for causing the brake shoe carried by the shiftable disk to contact with the braking member and move said braking member into engagement with the brake shoe carried by the fixed disk, said manual means including a ring mounted on the fixed disk, wedge members attached thereto, bolts carried by the shiftable brake shoe and associated with said wedge members whereby the shifting of the ring through the wedge members will cause the shiftable brake shoe to engage the braking member, and rock levers attached to said movable disk and connected to said ring whereby the shifting of the rock levers will shift the ring.

4. A braking mechanism for motor vehicles including in combination, a braking member attached to and movable with the wheel and capable of lateral movement thereon, a fixed disk, a brake shoe attached to said disk and having a tapered face adapted to cooperate with a similarly tapered face on the braking member, a shiftable disk associated with said fixed disk and fixedly held from rotation, a brake shoe mounted on said shiftable disk and having a tapered face adapted to engage a similarly tapered face on the opposite side of the braking member from that engaged by the first-named brake shoe, springs for separating said disks, manual means for shifting said shiftable disk toward the fixed disk for causing the brake shoe carried by the shiftable disk to contact with the braking member and move said braking member into engagement with the brake shoe carried by the fixed disk, flexible members connecting said disks and forming therebetween a vacuum chamber, and a pipe connection to the vacuum chamber whereby said chamber may be placed under vacuum and the shiftable disk shifted by atmospheric pressure thereon for causing the shiftable brake shoe to engage the braking member, said manual means for shifting the shiftable disk being so constructed as to permit the free movement of said disk when said chamber is placed under vacuum.

5. A braking mechanism for motor vehicles including in combination, a braking member attached to and movable with the wheel and capable of lateral movement thereon, a fixed brake shoe at one side of the braking member, a movable brake shoe at the other side of said braking member, springs for normally holding said brake shoes separated, manually controlled means for shifting the movable brake shoe into engagement with the braking member and the braking member into engagement with the fixed brake shoe, and vacuum controlled means for shifting said movable brake shoe into engagement with said braking member and the braking member into engagement with the fixed brake shoe, said manually controlled means being constructed so that it may be operated independently of the vacuum controlled means, or the vacuum controlled means operated independently of the manually controlled means, or the vacuum controlled means and manually controlled means operated in conjunction with each other for applying the brakes.

6. A braking mechanism for motor vehicles including in combination, a braking member attached to and movable with the wheel and capable of lateral movement thereon, a fixed disk, a brake shoe attached to said disk and having a tapered face adapted to cooperate with a similarly tapered face on the braking member, a shiftable disk associated with said fixed disk and fixedly held from rotation, a brake shoe mounted on said shiftable disk and having a tapered face adapted to engage a similarly tapered face on the opposite side of the braking member from that engaged by the first-named brake shoe, springs for separating said disks, manual means for shifting said shiftable disk toward the fixed disk for causing the brake shoe carried by the shiftable disk to contact with the braking member and move said braking member into engagement with the brake shoe carried by the fixed disk, said manual means including a ring mounted on the fixed disk and movable about the center of said disk, bolts carried by the shiftable brake shoe and extending through slots formed in said ring, rollers carried by each bolt, and a wedge member associated with each bolt and adapted to straddle the same and having cam faces with which said rollers contact, so that when said ring member is shifted, the shiftable disk will be shifted toward the fixed disk for engaging the braking member.

7. A braking mechanism for motor vehicles including in combination, a braking member attached to and movable with the wheel and capable of lateral movement thereon, a fixed disk, a brake shoe attached to said disk and having a tapered face adapted to cooperate with a similarly tapered face on the braking member, a shiftable disk associated with said fixed disk and fixedly held from rotation, a brake shoe mounted on said shiftable disk and having a tapered face adapted to engage a similarly tapered face on the opposite side of the braking member from that engaged by the first-named brake shoe, springs for separating said disks, manual means for shifting said shiftable disk toward the fixed disk for causing the brake shoe carried by the shiftable disk to contact with the braking member and move said braking member into engagement with the brake shoe carried by the fixed disk, said manual means including a ring mounted on the fixed disk and movable about the center of said disk, bolts carried by the shiftable brake shoe and extending through slots formed in said ring, rollers carried by each bolt, a wedge member associated with each bolt and adapted to straddle the same and having cam faces with which said rollers contact, so that when said ring member is shifted, the shiftable disk will be shifted toward the fixed disk for engaging the braking member, and rock levers attached to said shiftable disk and connected to said ring whereby the shifting of the rock levers will shift the ring.

8. A braking mechanism for motor vehicles including in combination a braking member attached to and movable with the wheel and capable of lateral movement thereon, a fixed disk, a brake shoe attached to said disk and adapted to contact with a braking surface on the braking member, a shiftable disk associated with said fixed disk and fixedly held from rotation, a brake shoe mounted on said shiftable disk and adapted to engage a braking face on the opposite side of the braking member from that engaged by the first-named brake shoe, means for separating said disks, manual means for shifting said shiftable disk toward the fixed disk for causing the brake shoe carried by said shiftable disk to contact with the braking member and move said braking member into engagement with the brake shoe carried by the fixed disk, flexible members connecting said disk and forming therebetween a vacuum chamber, a pipe connection to the vacuum chamber whereby said chamber may be placed under vacuum and the shiftable disk shifted by atmospheric pressure thereon for causing the shiftable brake shoe to engage the braking member, said manual means for shifting the shiftable disk being so constructed as to permit the free movement of said disk when said chamber is placed under vacuum.

FREDERICK L. SHELOR.